United States Patent
Hierl et al.

(10) Patent No.: US 12,040,514 B2
(45) Date of Patent: Jul. 16, 2024

(54) FLUSHING SYSTEM AND METHOD FOR MONITORING SAME

(71) Applicant: HPS Home Power Solutions AG, Berlin (DE)

(72) Inventors: Andreas Hierl, Berlin (DE); Jonas Schulte, Berlin (DE); Hendrik Leverenz, Berlin (DE); Renaldo Schönfeldt, Berlin (DE)

( * ) Notice: Subject to any disclaimer, the term of this patent is extended or adjusted under 35 U.S.C. 154(b) by 504 days.

(21) Appl. No.: 17/416,632

(22) PCT Filed: Dec. 18, 2019

(86) PCT No.: PCT/EP2019/086025
§ 371 (c)(1),
(2) Date: Jun. 21, 2021

(87) PCT Pub. No.: WO2020/127537
PCT Pub. Date: Jun. 25, 2020

(65) Prior Publication Data
US 2022/0059854 A1     Feb. 24, 2022

(30) Foreign Application Priority Data
Dec. 20, 2018 (DE) .................... 10 2018 133 203.3

(51) Int. Cl.
*H01M 8/04223*     (2016.01)
*C25B 1/04*     (2021.01)
(Continued)

(52) U.S. Cl.
CPC .......... *H01M 8/04231* (2013.01); *C25B 1/04* (2013.01); *C25B 15/02* (2013.01);
(Continued)

(58) Field of Classification Search
CPC ......... H01M 8/04231; H01M 8/04179; H01M 8/04425; H01M 2250/10; H01M 8/00–2495; C25B 15/02; C25B 1/04
See application file for complete search history.

(56) References Cited

U.S. PATENT DOCUMENTS 9,570,768 B2 *   2/2017   Araki ................ H01M 8/04201
2004/0013923 A1   1/2004   Molter et al.
(Continued)

FOREIGN PATENT DOCUMENTS

CN     205376647     7/2016
DE     102014103724     9/2015
(Continued)

OTHER PUBLICATIONS

Jumo, Level measurement with pressure sensors—also in potentially explosive areas, https://www.jumo.de/sensoren/fuellstandsmessung.html, Jan. 3, 2018 (w/ English translation).

*Primary Examiner* — Matthew J Merkling
(74) *Attorney, Agent, or Firm* — Pandiscio & Pandiscio

(57) ABSTRACT

The present invention relates, amongst other things, to a flushing system (40) for flushing an energy source device (15) and/or an energy sink device (16) of an energy system (10), the flushing system comprising: a flushing device (41) having a storage chamber (45), which on the input side is fluidically connected to a first line portion (46), which is formed as a flushing line starting from the energy source device (15), and/or to a second line portion (47), which is formed as a flushing line starting from the energy sink device (16); a first monitoring device (50) for monitoring the state of the storage chamber (45), the first monitoring device (50) comprising at least one sensor device (50*a*) associated with the storage chamber (45) for monitoring the fill level of the storage chamber (45); and also optionally a compensation container device (54) fluidically connected to the stor- (Continued)

age chamber (45). In order to further advantageously modify the flushing system (40) by simple structural and economical measures so that the flushing system can be monitored in a safety-related manner, the flushing system (40) comprises a safety control device (53); the sensor device (50*a*) for monitoring the fill level of the storage chamber (45) is connected to the safety control device (53) via an interface (80, 81) associated with the storage chamber; and the flushing system (40) optionally has at least one further monitoring device (66, 70) for monitoring the state of the compensation container device (54) and/or for monitoring valve devices (48, 49, 57, 59) which is/are connected to the safety control device (53) via interfaces associated with the compensation container device and/or valve devices.

20 Claims, 2 Drawing Sheets

(51) Int. Cl.
  *C25B 15/02*     (2021.01)
  *H01M 8/04119*   (2016.01)
  *H01M 8/0438*    (2016.01)

(52) U.S. Cl.
  CPC ... *H01M 8/04179* (2013.01); *H01M 8/04425* (2013.01); *H01M 2250/10* (2013.01)

(56) References Cited

U.S. PATENT DOCUMENTS

| | | | | |
|---|---|---|---|---|
| 2008/0160360 | A1* | 7/2008 | Fennimore | H01M 8/04783 429/408 |
| 2011/0081584 | A1* | 4/2011 | Nakayama | H01M 8/04761 429/414 |
| 2012/0115055 | A1* | 5/2012 | Wake | H01M 8/04141 429/414 |
| 2013/0149627 | A1* | 6/2013 | Nishimura | H01M 8/04228 429/444 |
| 2018/0294497 | A1* | 10/2018 | Asai | H01M 8/04 |

FOREIGN PATENT DOCUMENTS

| | | |
|---|---|---|
| WO | WO2017089466 | 6/2017 |
| WO | WO2017089468 | 6/2017 |
| WO | WO2017089469 | 6/2017 |

* cited by examiner

FLUSHING SYSTEM AND METHOD FOR MONITORING SAME

REFERENCE TO PENDING PRIOR PATENT APPLICATIONS

This patent application claims benefit of International (PCT) Patent Application No. PCT/EP2019/086025, filed 18 Dec. 2019 by HPS Home Power Solutions GmbH for FLUSHING SYSTEM AND METHOD FOR MONITORING SAME, which in turn claims benefit of German Patent Application No. DE 10 2018 133 203.3, filed 20 Dec. 2018.

The two (2) above-identified patent applications are hereby incorporated herein by reference.

FIELD OF THE INVENTION

The present invention first relates to a purging system for purging components of an energy system according to the preambles of the independent claims 1 and 3. Furthermore, the invention relates to an energy system according to the preamble of the independent claim 19. Finally, the invention also relates to a method for monitoring such a purging system.

BACKGROUND OF THE INVENTION

Energy systems of the generic type are already known in many ways in the prior art. Such systems are commonly used to generate and provide energy for a wide variety of fields of application.

In a known type of such energy systems, energy is generated in a first energy source. The energy generated may be, for example, hydrogen. The hydrogen is produced, for example, in an electrolysis device and it is stored in a second energy source device, which is, for example, a storage device. This is, for example, a first mode of operation of the energy system. During the operation of the energy system, the hydrogen is withdrawn from the storage device and consumed in a first energy sink device. This is, for example, a second mode of operation of the energy system. Such a first energy sink device is, for example, a fuel cell device. Usually, the aforementioned components of the energy system are spatially separated from one another and are connected to one another via a connecting line device. Both of the aforementioned modes of operation usually require a different pressure level. While pressures of 20 to 60 bar prevail in the first mode of operation with the electrolysis, for the operation of the fuel cell device in the second mode of operation, pressures of less than 20 bar are required. For example, such a known energy system is described in DE 103 07 112 A1.

Within the scope of operation of such an energy system, it is necessary to regularly purge the fuel cell device, in particular on its anode side and/or the electrolysis device, in particular on its cathode side. Such a flushing, also referred to as "purging", is particularly necessary in order to lead away undesired foreign gas components, and liquid water which accumulates locally in the cell structures, which negatively influence the performance and the service life of the fuel cell device and/or of the electrolysis device, at regular intervals or depending on the operating modes. The purging is carried out with the aid of a suitable purging system.

A known purging system, from which the present invention departs, is disclosed and described in WO 2017/089466 A1 of the applicant. According to this known solution, a purging volume flow loaded with hydrogen is generated during the purging process and is initially stored in a storage chamber assigned to a purging device. The storage chamber serves as a buffer storage or as an intermediate store. Subsequently, the purging volume flow loaded with hydrogen is discharged from the storage chamber to the environment as a discharge volume flow via an outflow device.

For example, the fuel cell device and the electrolysis device as well as the purging system are components of a first subsystem of the energy system, which is accommodated, for example, in a system cabinet. The discharge volume flow, which contains a few percentages of hydrogen, is delivered to the environment in such a way that it flows via the outflow device into a specific region in the system cabinet designated as a mixing zone. This region is specially designed for this purpose. This is because the discharge volume flow, due to its hydrogen content, which at this point is a hazardous gas, is an explosive gas mixture, so that in the region of the outlet no ignition sources must be located in the vicinity thereof. In order to bring the hydrogen mixture to a value below the lower explosion limit, it is necessary to dilute the hydrogen-loaded discharge volume flow to such an extent that the hydrogen content in the volume flow slips below the lower explosion limit. This is achieved, for example, by mixing the discharge volume flow in the mixing zone with a further air volume flow. This further air volume flow is, for example, an exhaust air volume flow, which arises at a different point during operation of the energy system.

As a rule, the purging system comprises various components, which are connected to one another via line sections of a connecting line device. During operation of the purging system, at any time, it is necessary to prevent hydrogen from escaping in an uncontrolled manner at any points of the purging system. This happens, in particular, when a fault occurs somewhere in the purging system. For example, individual line sections of the purging system can become leakproof. The same applies to valve devices and the like. The storage chamber of the purging device is often provided as a volume-variable storage chamber, for example in the form of a bellows. Such a storage chamber is a volume-variable pressure vessel with gas contained therein, which can form a dangerous explosion-capable atmosphere in the event of intended and faulty exit. In particular, a bellows is not overpressure-proof, and its material is subject to embrittlement, making leaks possible. In the monitoring of the purging system, no explosion-proof devices, for example sensor devices, can be used because of the risk of explosion due to escaping hydrogen. However, the use of explosion-protected special safety devices is cost-intensive and thus to be prevented, if possible.

SUMMARY OF THE INVENTION

On the basis of the above-mentioned prior art, it is therefore the object of the present invention to further advantageously modify a purging system of the generic type by simple design and cost-effective measures to the effect that safety-oriented monitoring of the purging system is made possible, specifically without the use of corresponding, explosion-proof special safety devices such as, for example, hydrogen sensors or the like.

According to the invention, this object is solved by the purging system comprising the features according to the independent claim 1, which represents the first aspect of the invention, by the purging system comprising the features according to the independent claim 3, which represents the second aspect of the invention, by the energy system comprising the features according to the independent claim 19, which represents the third aspect of the invention, and by the method comprising the features of independent claim 40, which represents the fourth aspect of the present invention. Further features and details of the invention become apparent from the dependent claims, from the description and from the drawings. In this context, features and details which are disclosed in connection with the first aspect of the invention apply to their full extent also in connection with the second, third and fourth aspect of the invention respectively, and vice versa, so that with regard to the disclosure of one aspect of the invention, full reference is always made to the other aspects of the invention respectively.

The basic idea of the present invention is to provide a security concept for the purging system. The present invention makes it possible, as becomes evident from the different aspects of the invention, to monitor the purging system, in particular the state of individual components of the purging system, by means of which, in particular, errors are detected and, when errors are detected, suitable error counter-measures can be initiated. The purging system is preferably provided for continuous state monitoring and state analysis. One basic component of the purging system according to the invention is a specially designed safety control device, by means of which safety-oriented functions are carried out. In particular, according to the various aspects of the invention, it can be achieved that no dangerous explosive atmospheres can arise unnoticed in the regular mode and in the error mode of the purging system.

The invention is first directed to a purging system, by means of which individual components of an energy system are purged. The purging system is, in particular, an entity being composed of a plurality of components, the components being connected to one another to form a dedicated unit. The purging system is preferably a component of an energy system. The energy system is, in turn, in particular an entity composed of a plurality of components, wherein the components are connected to one another to form a dedicated unit. In the present case, the energy system is preferably a system for generating or providing energy, preferably electrical energy. Generally, the invention is not limited to certain types of energy systems. In the following, different preferred embodiments are described with this regard.

According to a preferred embodiment, the energy system is a house energy system. House energy systems are known in principle from the state of the art and are used to supply houses, for example low-energy houses, passive houses or zero-energy houses, with energy in the form of heat and in particular in the form of current, for example current from regenerative energy sources such as, for example, photovoltaic (PV) generators or small wind power plants. Such a house energy system provides the basis that the energy requirement of a house, in particular of a low-energy house, a passive house or a zero-energy house, can be completely covered from renewable energy sources both with regard to the current and heat requirement and thus consists of complete $CO_2$ freedom during operation. At least however, the electricity demand of a house can be covered almost completely from renewable energy sources, in particular by means of a PV generator and/or a small wind power plant, in the sense of seeking an increase in self-consumption.

Such a house energy system is described, for example, in patent applications WO 2017/089468 A1 and WO 2017/089469 A1 of the applicants, the disclosure of which being incorporated into the description of the present patent application.

According to a preferred embodiment, a house power system of the type mentioned comprises the following basic features:
- a DC feed point, preferably designed for a nominal voltage of 48 volts, and/or an AC feed point, preferably designed for a voltage of 230 volts or 110 volts, wherein the DC feed point and/or the AC feed point, during operation, is connected at least temporarily to an electrical equipment having a consumption power,
- a PV generator which is electrically connected at least temporarily to the DC feed point, in order to generate an electrical PV power,
- a fuel cell unit which is electrically connected at least temporarily to the DC feed point or to the AC feed point in order to generate an electrical fuel cell power,
- an electrolysis unit electrically connected to the DC feed point for generating hydrogen to be consumed by the fuel cell unit, wherein the electrolysis unit is supplied with an electrical electrolysis input power during operation,
- a hydrogen tank, in particular as a long-term energy storing device, which is, at least temporarily, fluidically connected to the fuel cell unit and to the electrolysis unit and which is provided to store hydrogen to be generated by means of the electrolysis unit and to be consumed by the fuel cell unit,
- a storage battery unit, in particular as a short-term energy storage device, which is electrically connected or to be connected to the DC feed point, such that an electrical PV power and an electrical fuel cell power can be stored in the storage battery unit, and an electrical electrolysis input power and a consumption power can be withdrawn from the storage battery unit; and
- a control module for controlling the house power plant.

According to the first and second aspects of the invention, a purging system is provided.

A purging system from which the present invention starts is disclosed and described, for example, in patent application WO 2017/089466 A1 of the applicant, the disclosure of which being incorporated into the description of the present patent application.

First, the basic structure and the basic mode of operation of a purging system according to the invention are described. The flushing system, which is referred to as a "purging system", is used to purge at least one energy source device and/or at least one energy sink device. This flushing process is referred to as "purging". These two components mentioned represent components of an energy system which is described in detail above in the general description and in connection with the third aspect of the invention further below, so that at this point full reference is also made in this respect to the corresponding disclosures in this regard and is referred to. According to a preferred embodiment, on the basis of which the invention is explained by way of example, the energy source device is an electrolysis device, in particular for producing hydrogen. The energy sink device is preferably a fuel cell device.

The purging system comprises a purging device which is provided in such a way that it is capable of generating a discharge volume flow during a purging process. This discharge volume flow, which contains hydrogen, which represents a hazardous gas at this point, arises, for example, when the fuel cell device, in particular on the anode side thereof, and/or the electrolysis device, in particular on the cathode side thereof, is/are purged.

According to a preferred embodiment, the purging system comprises a purging device with a purging channel which comprises a first and at least one second purging channel section which can be fluidically connected to one another via a purge valve of the purging device, and further comprising a buffer storage device which is fluidically connected to the purging channel and is connected downstream of the purge valve and has at least one storage chamber which is provided to temporarily store a pulse-like with a purge mass flow from the fuel cell device and/or from the electrolysis device, fluid mass to be discharged, in such a way that said fluid mass can be discharged from a discharge device which is fluidically connected to the second purge channel section together with a discharge mass flow which is the discharge volume flow, which is less than the flushing mass flow. The discharge mass flow, which typically consists of large parts of hydrogen, can be admixed to an air mass flow, which is the air volume flow, so that the resulting gas mixture has a hydrogen concentration in all operating states clearly below the lower ignition limit of hydrogen in air. In particular this air volume flow is a flow, in particular an exhaust air volume flow, that arises at a different point during the operation of the energy system. This dilution effect allows safe operation of the energy system. By virtue of the fact that a buffer storage device having a storage chamber is connected downstream of the purge valve, a fluid mass discharged in a pulsed manner with the purging mass flow can be discharged with a discharge mass flow, which is lower than the purge mass flow. This advantageously results in a smoothing of the pulse-like purging mass flow, which advantageously leads to the avoidance of critical hydrogen concentrations with simultaneously lower exhaust air mass flow.

According to a preferred embodiment, the storage chamber is expandable, that means changeable in its volume. The storage chamber can be expandable by the pulse-like with the purging mass flow from the fuel cell device and/or the electrolysis device, to be discharged fluid mass. The storage chamber is particularly preferably designed as a bellows which can receive a respective purging volume, that is to say the purging mass flow multiplied by a pulse duration of a purge, without, or with only a slight build-up of counterpressure. Such a bellows is also referred to as a "purge bellows". A storage chamber designed as a bellows can be designed to be moved back into its unexpanded state by a gravitational force, in particular exclusively by a gravitational force of a preferably freely movable end plate of the bellows. For the targeted adaptation of the force which moves the bellows back into its unexpanded state, and thus the discharge time and the pressure profile of the bellows buffer over time, the gravitational force can also be amplified or partially compensated by an attached spring device.

As already mentioned, the discharge volume flow is provided from the storage chamber, which is designed in particular as a bellows. However, the present invention is not limited to this embodiment. According to a different embodiment, the storage chamber can be designed as a bubble storage device or as a piston storage device. As an alternative to an expandable design of the storage chamber, however, the storage chamber can also be designed as a rigid pressure vessel, in which the storage chamber is designed in such a way that the pulse-like with the purging mass flow from the fuel cell device and/or the electrolysis device, to be discharged fluid mass leads to a pressure increase in the storage chamber.

The purge system may be configured to adjust a purge volume flow to a discharge volume flow of less than 10%, preferably less than 3% of the purge volume flow. The discharge volume flow to the environment is preferably discharged via an exhaust air volume flow which is at least 50 Nm3/h and which is also referred to as the exhaust air volume flow. Preferably, a nominal operating pressure of the storage chamber is less than 50 millibar, preferably less than 20 millibar above an operating pressure of the exhaust air volume flow.

In the purging process, liquid water can be discharged as intended. In a preferred variant, the water is first separated from the gas stream and then advantageously returned to the process of the fuel cell and/or the electrolysis. The water separation can advantageously be realized in the storage chamber, since the flow velocities of the carrier gas are advantageously low for the separation of the liquid via gravitational forces. Preferably, the storage chamber has at least one inlet and/or one outlet for the purge gas. Liquid, which, together with the hydrogen-containing purge gas, enters the storage chamber at a high flow rate via the inlet, can preferably be separated from the gas steam gravimetrically and/or by flow-conducting and/or by drop-separating built-in devices and/or with corresponding tangential introduction by centrifugal forces or by other common methods according to the prior art. The liquid can preferably be collected at the bottom of the storage chamber and discharged closed off via the liquid outlet and preferably returned to the process.

The storage chamber can be connected to a compensation container device which comprises a compensation container. The compensation container device can serve as overpressure protection for the storage chamber. The hydrogen then flowing out into the compensation container leads to a pressure relief of the storage chamber. Water, which accumulates in the storage chamber, can also be discharged from the storage chamber into the compensation container device. From there, the water from the purging process can be returned for use, for example into the electrolysis device. The purging device comprises a filling level sensor device, in particular a filling level sensor device assigned to the storage chamber. Preferably, the filling level sensor device can be configured and arranged for detecting an expansion state of the storage chamber. The filling level sensor device can be configured, for example, as an optical sensor or as a magnetic sensor or as an ultrasonic sensor, and is preferably permissible for operation in a potentially hydrogen-containing environment. Preferably, the filling level sensor device is arranged and adjusted in such a way that, in the case of an expansion state of preferably at most 80% of the maximum volume, which can occur, for example, in the case of a valve device, for example a solenoid valve, which no longer closes incorrectly, it triggers a safety chain and prevents further outflow of hydrogen. In a preferred method, the quality of the purging process can also be monitored and/or the purging process can be transferred from a controlled process via the detection of the volume actually flushed into a regulated process.

According to the first aspect of the invention, a first preferred embodiment of a purging system is disclosed, which comprise the features of independent claim 1. In this first embodiment according to the invention, a filling level measurement of a storage chamber is implemented via pressure measurement.

The purging system is provided for purging an energy source device and/or an energy sink device of an energy system, and it comprises a purging device having a storage chamber. In this regard, reference is made to the general statements above. On the inlet side, the purging chamber is fluidically connected to a—first—line section designed as a flushing line, leading away as a purging line from the energy source device, and/or to a-second-line section designed as a flushing line, leading away as a purging line from the energy sink device, preferably with both. A fluid is generally a flowing medium, which can be liquid or gaseous. According to the present invention, the fluid is preferably a gaseous medium, which in particular can also have liquid constituents, for example a hydrogen-containing gas mixture with a certain water content. "Fluidically connected" means in particular that the connection between the components is realized such that the fluid can stream or flow through this connection. Such a connection is preferably a pipeline, a hose line, or a section thereof, and the like.

The purging system comprises a monitoring device for monitoring the state of the storage chamber. The monitoring device comprises at least a sensor device associated with the storage chamber for monitoring the filling level of the storage chamber. Depending on the embodiment of the invention, this sensor device for monitoring the filling level of the storage chamber can be configured in different ways. Some preferred exemplary embodiments thereof are explained in more detail in the further course of the description.

According to the invention, the purging system comprises a safety control device. This safety control device has the function that a safety-oriented monitoring of the purging system is realized. In particular, the safety control device is configured in such a way that it is capable to detect error states in the purging system and, upon detection of such error states, to initialize suitable counter-measures. The safety control device is preferably provided for continuous monitoring of the purging system. The safety control device can be configured in various ways. Some preferred exemplary embodiments thereof are explained in more detail in the further course of the description.

The sensor device for monitoring the filling level of the storage chamber is connected to the safety control device via an interface associated therewith. A definition for the interface in light of the present invention, which has validity for all aspects of the invention, is in particular a connection between two components: The term "interface" is also intended to include the connecting line between the components themselves. The interface can be unidirectional or bidirectional. Depending on the configuration of the components, the interface can be configured differently. For example, the interface may be a communication interface via which the components are communication-connected. This means in particular that communication takes place via the interface, for example in the form of a data transmission or a signal transmission. The interface can be provided either wired or wireless. Values detected by a component, for example by a sensor device, are transmitted via the interface to another component, for example to the safety control device. Commands, in particular control commands, can be transmitted from the safety control device via the interface. Other forms of interfaces allow fluids to be transferred via the interface. Such interfaces are then, for example, line sections via which the components are line-connected, for example via lines, for example pipelines, hose lines or the like. Preferably, both types of interfaces are used in the present invention according to the various aspects of the invention.

According to the first aspect of the invention, the sensor device comprises at least one pressure measuring device for monitoring the filling level of the storage chamber, or it is designed as such a pressure measuring device. By means of the pressure measuring device, the pressure prevailing in the storage chamber, which permits a conclusion as to the filling state of the storage chamber, is detected. This can be done, for example, by measuring the pressure in the storage chamber directly. According another embodiment, the pressure can be determined from other parameters, for example calculated. By use of a pressure measurement in the storage chamber, which preferably takes the form of a volume-variable storage chamber, the detection of all error states is possible, such as, for example, a leakage in the supply, a leakage in the storage chamber, a blockage of the discharge, a limitation of the maximum quantity, or the like. A monitoring can preferably be carried out by comparing the current pressure or filling level with respect to minimum and/or maximum reference values or final values, which is explained in more detail further below.

Preferably, the pressure measuring device can be configured as a pressure measuring device for detecting a differential pressure and/or for detecting a relative pressure and/or for detecting an absolute pressure. If the purging system is provided in a divided system cabinet having a right and a left cabinet half, as described further below in the context of a preferred exemplary embodiment, differential pressure determination and reference pressure determination are preferably carried out with a pressure in the right cabinet half. In the case of a differential pressure determination, the pressure measuring device itself can be located outside the system cabinet. For a relative pressure measurement, the pressure measuring device must be provided within the system cabinet. The evaluation and initiation of the error reactions preferably takes place by means of the safety control device, Pressure is one of the most important physical state variables besides temperature. The different types of pressure are distinguished in particular according to the reference pressure.

The unequivocal reference pressure is the pressure zero, which prevails in the vacuum space of the universe. A pressure related to this reference pressure is called absolute pressure. Absolut pressure sensor devices measure, for example, the pressure in comparison with a vacuum enclosed in the sensor device.

The difference between two pressures is called pressure difference dp. In cases where the difference between two pressures itself represents the measured variable, one speaks about differential pressure. In order to measure differential pressure, two different pressures are detected. A differential pressure is indicated only if the measured values are different. Differential pressure measuring devices comprise in particular two separate pressure connections.

Relative pressure sensor devices measure the pressure with respect to the air pressure of the environment. Fluctuations in air pressure, which are caused, for example, due to changes in the weather or altitude, directly transfer to the current measured pressure value with these sensor devices. If the pressure present at the relative pressure sensor device is greater than the ambient pressure, one speaks about overpressure. A pressure that is less than atmospheric pressure is referred to as an underpressure.

According to a first embodiment, the pressure measuring device according to the invention comprises a pressure sensor device or it is designed as such a pressure sensor device. The pressure sensor device can be arranged on or in the storage chamber. Via an interface, the pressure sensor device can be connected directly to safety control device, preferably communication-connected. The pressure sensor device measures the pressure in the storage chamber and transmits the measured values to the safety control device, where the measured values are evaluated.

According to another embodiment, the pressure measuring device comprises a pressure sensor device which is connected, in particular line-connected, to another component of the pressure measuring device via an interface. This other component of the pressure measuring device is then preferably connected via an interface to the safety control device, for example, communication-connected. In such a case, the pressure measuring device is preferably a pressure measuring device for determining the differential pressure.

According a preferred embodiment, the pressure sensor device of the pressure measuring device is provided as a pressure measuring cell, for example in the form of a capacitive pressure measuring cell. Pressure measuring cells per se are familiar to the person skilled in the art and therefore require no further detailed explanation here. Basically, the invention is not limited to certain types of pressure measuring devices.

The pressure in the storage chamber can also be determined in other ways, for example, by determining, for example, computing the pressure via other parameters of the purging system or components of the purging system. This is described in greater detail below in connection with the second aspect of the invention on the basis of various exemplary embodiments.

According to the second aspect of the invention, a second preferred embodiment of a purging system is disclosed, which comprises the features of independent patent claim 3.

The purging system is likewise used for purging an energy source device and/or an energy sink device of an energy system, and comprises a purging device with a storage chamber, which is fluidically connected on the inlet side to a—first—line section, which departs from the energy source device and is configured as a purging line, and/or to a—second—line section, which departs from the energy sink device and is designed as a purging line. To this extent, the purging system corresponds to the purging system according to the first aspect of the invention and to the purging system explained in the general description, so that, in order to avoid repetitions, full reference is made to the corresponding disclosures above.

The purging system comprises a first monitoring device for monitoring the state of the storage chamber, wherein the first monitoring device comprises at least one sensor device associated with the storage chamber for monitoring the filling level of the storage chamber. According to the second aspect of the invention, a specific configuration of the first monitoring device does not yet occur at this point. However, some preferred embodiments for the first monitoring device are described further below.

In addition, the purging system according to the second aspect of the invention comprises a compensation container device, which is fluidically connected to the storage chamber. The compensation container device is used to provide compensation for the storage chamber, in particular when it has reached a maximum or critical filling level with regard to the filling quantity and/or filling pressure. Preferred exemplary embodiments with this regard are explained in detail in the general description further above and further below.

As in the first aspect of the invention, the purging system according the second aspect of the invention comprises a safety control device, so that with regard to the configuration and mode of operation of the safety control device full reference is made to the corresponding disclosures further above. Accordingly, the safety control device is provided for safety-oriented monitoring of the purging system, in particular for detecting error states and for initiating error reactions.

As in the first aspect of the invention, the sensor device for monitoring the filling level of the storage chamber is connected via an interface associated therewith to the safety control device in a suitable manner, which results from the configuration of the sensor device. With regard to the configuration and function of the interface and of the connection, full reference is likewise made to the corresponding disclosures with regard to the first aspect of the invention.

In contrast to the purging system according the first aspect of the invention, the purging system according to the second aspect of the invention comprises at least one further—second—monitoring device, which is configured to monitor the state of the compensation container device, and which, analogously to the first monitoring device, is connected via an interface assigned thereto to the safety control device. In the following, some preferred exemplary embodiments are also described for the second monitoring device.

The safety control device according to the various aspects of the invention can be configured in different ways. Preferably, the safety control device comprises hardware components and/or software components and/or electrical components and/or a combination of hardware components, software components and electrical components. For example, the security control device can comprise a data processing device or being designed as a data processing device. Software can be implemented in the data processing device, which software executes the safety-oriented monitoring of the purging system. The evaluation and initiation of the error reaction takes place in this case by the data processing device. Alternatively, or additionally, the safety control device can comprise a safety controller or is configured as a safety controller. A safety controller is particularly a control device, by means of which certain processes, in this case the monitoring of the purging system, are controlled electronically. Such a safety controller generally comprises at least one integrated circuit. The evaluation and initialization of the error reactions takes place by the safety controller in this case. Alternatively, or additionally, the safety control device can comprise a safety logic with at least one safety relay or can be configured as such. The evaluation and initiation of the fault reaction takes place in this case by the safety logic unit with the safety relay.

In particular, the purging system is arranged in a system cabinet, in particular an airtight system cabinet. The system cabinet is preferably a system cabinet in which various components of the energy system, for example the electrolysis device and the fuel cell device, are also accommodated. The system cabinet can be divided, for example, into a right-hand cabinet half and a left-hand cabinet half, having an intermediate wall lying therebetween. If, for example, the storage chamber is located in the left half of the cabinet and the pressure measuring device is located in the right cabinet half, the pressure drop of the environment should lead to a brief rise in pressure in the measurement when the right-hand cabinet half is opened while a pressure prevails in the storage chamber. This can be detected via the pressure measuring device and evaluated in the safety control device. This makes it possible, for example, to detect whether the right-hand cabinet half is leakproof and the air flow present in the system cabinet is not discharged to the outside via the exhaust air to the surroundings, but rather via the leaky point in the system cabinet.

As has already been explained in the general part of the description above, the storage chamber is preferably configured as a volume-variable storage chamber, for example as a bellows or purge-bellows. In such a case, the sensor device for monitoring the filling level of the storage chamber is preferably configured as a sensor device for detecting the expansion of the storage chamber. In a manner as described above, this sensor device is suitably connected to the safety control device via an interface to the safety control device, for example communication-connected. Such a sensor device for detecting the expansion of the storage chamber can be configured in various ways. According to a preferred embodiment, the sensor device for detecting the expansion of the storage chamber is designed as an optical light barrier device. Such a light barrier device offers good protection against overpressure in the storage chamber, which is visible in the case of a volume-variable storage chamber, in particular by a too great deflection of the storage chamber. In an alternative embodiment, such a sensor device can also be designed, for example, as a laser-supported distance measuring device or as a strain gauges device. The invention is not limited to the examples mentioned.

Alternatively, or additionally, the sensor device for monitoring the filling level of the storage chamber can comprise a pressure measuring device or it can be configured as a pressure measuring device, in particular for detecting the pressure within the storage chamber. The pressure measuring device, which is connected via a suitable interface to the safety control device, for example line-connected and/or communication-connected, can be provided in particular as a pressure measuring device for detecting a differential pressure and/or for detecting a relative pressure and/or for detecting an absolute pressure. Such a pressure measuring device is preferably one which is described in detail in connection with the first aspect of the invention, so that, in order to avoid repetitions at this point, full reference is made to the corresponding disclosures further above.

Subsequently, the compensation container device, which has already been explained in general further above, so that full reference is also made to the disclosures further above at this point, is described in greater detail. The compensation container device preferably comprises a compensation container which is filled or can be filled at least partially with a liquid. The liquid is preferably water, in particular ultra-pure water. Ultra-pure water can also be used for other processes in the energy system, for example in the electrolysis device. Furthermore, the compensation container device comprises a compensation tube, which is connected to the storage chamber, in particular in an airtight manner, and which opens into the compensation container. Optionally, the compensation container comprises a—third—line section being configured as a supply line to the compensation container, and/or a—fourth—line section being designed as a discharge line from the compensation container.

Such a compensation container device is now described on the basis of a more specific and preferred exemplary embodiment. The compensation container is preferably located below the storage chamber, for example the bellows. The storage chamber is connected in an airtight manner at the bottom to the compensation tube. The compensation tube ends in the compensating container. Since the compensation container is partially filled with the liquid, in particular water, the compensation tube ends within the liquid column located in the compensation container. A gas containing a hazardous gas, in particular hydrogen, and also liquid, in particular water, can drain-off via the compensation tube from the storage chamber into the compensation container. The compensation container thus serves, on the one hand, as an overpressure compensation for the storage chamber. If the pressure in the storage chamber is too large, or if the storage chamber expands too far, the gas mixture out of the storage chamber presses against the liquid column in the compensation tube and in the compensation container. The gas is forced through the liquid column in the compensation tube and bubbles into the intermediary space of the compensation container, which is located between the surface of the liquid column and an upper cover of the compensation container. With increasing pressure in the storage device, the level in the compensation tube drops so that the level in the compensation tube, if it is correspondingly detected, can be taken a measure of the pressure existing in the compensating tube. The pressure prevailing in the storage chamber can be used. Such an example will be described further below.

In addition, liquid, in particular water, is also located in the storage chamber, which also passes into the compensation chamber via the compensation tube. This is preferably carried out according to the principle of the communicating tubes known per se. The liquid can be discharged via the discharge line when the liquid column in the compensation container has reached a maximum height. For this purpose, the discharge line preferably comprises a valve device. The maximum height of the liquid column in the compensation container is preferably measured by means of a suitable sensor device. The measured values of the sensor device are evaluated in the safety control device, which for this purpose is connected, in particular communication-connected, to the sensor device via an interface in the manner described above. Such an example will be explained further below. Liquid, in particular water, can be introduced via the supply line into the compensation container. The supply line therefore also preferably comprises a valve device. The valve devices are, for example, shut-off valves, in particular solenoid valves. As a result of the filled height of the liquid column in the compensation tube, the pressure behavior in the storage chamber can, for example, be influenced and adjusted. At different air pressures, or in the case of changing maximum permissible pressures in the storage chamber, for example, the height of the liquid column in the compensation container can be set differently. The draining and filling of liquid from and into the compensation container is preferably controlled via the safety control device which is, in such a case, in the manner described above, preferably connected, in particular communication-connected, via an interface with the valve devices. Such an example will be discussed in detail below.

As a result of such a configuration of the compensation container device, a regular exchange of the liquid, in particular of the water, is also possible in particular, for example for protection against germination. Thus, it can be provided, for example, that via specific commands of the safety control device at defined time intervals or at defined times the liquid is discharged from the compensation container and subsequently refilled. By integrating its own liquid treatment, in particular water treatment, in the purging system or in the energy system, for example, simple liquid, for example simple tap water, can be used.

As already indicated above, it is preferred if the monitoring device for monitoring the state of the compensation container device comprises a device for monitoring the liquid column within the compensation container. This measure is preferably taken in addition to those already described above. The device for monitoring the liquid column can in particular comprise a switch device for emptying and filling the compensation container or can interact with the latter. The switch device is preferably a so-called reed switch. Reed switches per se are familiar to those skilled in the art. In the manner described above, the device for monitoring the liquid column, preferably the switch device, is connected via an interface to the safety control device, in particular communication-connected. In this way, the safety control device can activate the device for monitoring the liquid column if necessary, for example if the liquid in the compensation container is to be exchanged at specific times or at specific time intervals, or if the liquid column in the compensation container has too low a height or too great a height. This makes it possible to monitor the compensation container on the part of the safety control device by means of the device for monitoring the liquid column. By way of example, a regular test of the device for monitoring the liquid column via the safety control device is possible by emptying and filling the compensation container, for example by means of a controlled actuation of the switch device. Depending on the configuration it is possible, for example, for the switch device to actuate, that is to say open or close, an inlet or outlet being provided directly at the compensation container.

If valve devices, by means of which the inlet and the outlet are controlled, are arranged in a feed line and outlet line of the compensation container in a manner as described above, corresponding switch devices are preferably in cooperation with the valve devices, or are components of the valve devices, so that the valve devices, upon actuation of the switch devices, get opened or closed.

Preferably, a time function is implemented in the safety control device, which time function is provided in order to monitor the refill time of the liquid into the compensation container after emptying. In this case, in particular, the period of time required for refilling the storage container after emptying is measured. This measured time period can be compared in the safety control device with reference values. If a reference value is exceeded or fallen below, for example, an error can thereby be inferred in the safety control device. Likewise, the time function can serve to ensure that the compensation container is emptied at specific times or at specific time intervals and filled again. According to another embodiment, an event-related function can be implemented in the safety control device. Thus, for example, it can be detected whether a certain event has occurred, for example whether the liquid column in the compensation container is too high or too low. This, again, is also preferably effected by a comparison with corresponding reference values in the safety control device. In a preferred embodiment, the time function for monitoring the refilling time of the liquid, preferably of the water, after triggering the switch device is evaluated in the safety control device, for example compared, to maximum and/or minimum reference values.

According to a further embodiment, the monitoring device for monitoring the state of the compensation container device preferably comprises a device for detecting the height of the liquid column in the compensation container, which device is in particular provided in the form of a float sensor device or as a device for weight measurement. This measure is preferably carried out in addition to the measures already described above or as an alternative to the measure described immediately above. By means of this device, the actual height of the liquid column within the compensation container can be detected. For this purpose, the device for detecting the height of the liquid column is in turn connected in the manner described above via an interface is connected to the safety control device, for example communication-connected. The values detected by the device for detecting the height of the liquid column are transmitted via the interface to the safety control device and evaluated there, for example by a comparison with respective reference values. If the liquid column is too low, for example, this could indicate a leakage in the compensation container. If the liquid column is too high, for example, this could indicate that draining of liquid from the compensation container does not function properly.

According to a further preferred embodiment, the device for detecting the height of the liquid column in the compensation container comprises a pressure measuring device for determining the differential pressure between the pressure in the storage chamber and the pressure of the liquid column in the compensation. This measure is preferably carried out in addition to measures already described above or as an alternative to measures described above. This pressure measuring device can be configured, for example, as a separate—second—pressure measuring device which is independent of the—first—pressure measuring device described further above. Or, however, the said further—second—pressure measuring device is a component of the—first—pressure measuring device described further above. In this case, the further pressure measuring device in particular represents a functionality of the—first—pressure measuring device described further above. The latter mentioned variant has, in particular, the advantage that the number of components required can be reduced. The further—second—pressure measuring device, regardless according to which variant, is connected, as described further above, to the safety control device via a suitable interface, for example line-connected and/or communication-connected. The further—second—pressure measuring device is preferably configured in a manner as described in the context of the first aspect of the invention, so that, in order to avoid repetitions with regard to the configuration and functioning of the further—second—pressure measuring device, as well as for its cooperation with the safety control device, at this point full reference is made to the preceding statements on the first aspect of the invention. The aforementioned pressure measurement can be carried out in different ways. A preferred exemplary embodiment therefore is now described.

According to this exemplary embodiment, the pressure measuring device, which is configured in particular as a pressure measuring device for determining the differential pressure, preferably interacts with a measuring tube which protrudes outwards from the compensation container. This measuring tube is preferably closed at its free end. Some liquid from the compensation container and air are partially present in the measuring tube. The further—second—pressure measuring device for determining the differential pressure is provided for determination of the differential pressure between the pressure in the storage chamber and the pressure of the air in the measuring tube. The determined differential pressure is evaluated in the safety control device, for example, in that the determined differential pressure values are compared against reference values in the manner described further above.

In order to adjust the measuring tube, said measuring tube is preferably connected to a pump device for air, in particular a bead pump device. The use of such a pump device is used in particular for "zeroing" the measuring tube. An overpressure exists within the measuring tube due to the counter-pressure of the liquid column. If the measuring tube is leakproof, the overpressure can be reduced and the signal can be falsified. Such errors can be detected by means of a regular actuation of the pump device, which fills the measuring tube with air until air "pearls out" into the compensation container. The pump device is preferably controlled by means of the safety control device. For this purpose, the pump device is connected, in particular via a suitable interface, to the safety control device, for example communication-connected. Via the safety control device, the pump device can get actuated, for example as described above in the context of a time function. The measuring tube with the pump device is used in particular for maintenance-free, reliable monitoring of the filling level in the compensation container. The pump device as an ignition source is sufficiently far away, for example outside the system cabinet or in the right-hand cabinet half. The liquid level or the liquid column can be detected over a long period of time.

According to a preferred development of the purging system, the further—second—monitoring device for monitoring the state of the compensation container device and/or to the first monitoring device for monitoring the state of the storage chamber comprises/comprise a device for detecting the height of the liquid column, that is to say the level, in the compensation tube. This measure is preferably carried out in addition to measures already described above or as an alternative to measures described above. As explained further above, the compensation container serves firstly as an overpressure compensation in the storage chamber. If the pressure in the storage chamber is too large, or if the storage chamber expands too far, the gas mixture presses out of the storage chamber against the water column in the compensation tube. The gas is forced through and "pearls" into the intermediate space between the liquid column and the cover in the compensation container. The level in the compensation pipe decreases with increasing pressure in the storage chamber. Knowledge of the level thus permits conclusions to be drawn about the pressure prevailing in the storage chamber. The device for detecting the level of the level in the compensation tube can, for example, be realized optically, for example with the aid of a measuring scale, or else by means of another sensor device, for example a float sensor device. If a sensor device is used, it is preferably connected, for example communication-connected, to the safety control device via a suitable interface. The evaluation is thus carried out in the safety control device, for example as in the manner described further above.

As already described above, a valve device is arranged in at least one of the line sections. The purging system preferably comprises a further—third—monitoring device for monitoring the operability of the valve device(s), wherein the further—third—monitoring device is connected to the safety control device via an interface assigned thereto in the manner described further above, in particular communication-connected. This measure is preferably carried out in addition to measures already described above or as an alternative to measures described above. This further—third—monitoring device is provided in such a way that it is capable of the valve device being connected to the safety control device via suitable interfaces and in particular being able to communicate. As is generally described further above, the safety control device may, for example, issue commands to open and close the valve devices according to specifications. The further—third—monitoring device can additionally or alternatively also comprise at least one sensor device, which can be provided in such a way that it is capable of detecting the tightness of the valve device(s). The commands and possibly determined sensor values are then transmitted via the interface. By means of the further—third—monitoring device, a monitoring of the states of the input and output valve devices is thus realized in particular. The release as to whether a valve device is allowed to be opened is effected via the safety control device, for example. In addition, a permanent check can be made as to whether valve devices are roughly leakproof. A check can also be made after release, how long a valve device has been opened. The valve devices are preferably provided as shut-off valves, for example solenoid valves.

Preferably, the safety control device comprises a comparison device for comparing detected sensor device values and/or pressure measurement device values with reference values, in particular with maximum and/or minimum reference values. Alternatively, or additionally, command functions can be stored in the safety control device, for example in a module with commands. Via such comparison processes and command functions, the safety control device can monitor and control individual components of the purging system in the manner already described further above. For example, command functions may be time-related and triggered, that is related to the conditions of time. For example, a control and/or monitoring can take place at specific times, at specific time intervals, at specific points in time, for specific time intervals or the like. Alternatively, or additionally, command functions may be event-related and triggered, for example, upon the occurrence of a particular event. Upon the occurrence of such an event, an activity is derived therefrom.

According to a further embodiment, the safety control device preferably comprises an interface, for example a communication interface, to an operating management device of the purging system or of the energy system. As a result, safety-relevant states of the purging system can also be used for non-safety functions.

The individual different monitoring measures described above can be carried out either individually or in any combination. The more monitoring measures are performed in parallel, the more accurate and more comprehensive is the monitoring of the purging system. In particular, a continuous monitoring, in particular a continuous state analysis, is possible with the present invention. By means of the purging system according to the invention, the state of the purging system, in particular individual components of the purging system, can be monitored without having the need to use components, which represent ignition sources. Because of the possible escape of hydrogen in the relevant sensitive regions of the purging system, such ignition sources are not permitted or undesired. The purging system according to the invention makes comprehensive monitoring possible.

When error states are detected, in particular via the safety control device, preferably suitable error reactions are initiated. Such error reactions can be, for example, the display of the error states on a display device, so that the error states can be eliminated. Additionally, or alternatively, acoustic warning signals may be generated. Depending on the type and degree of the error, individual components of the purging system, up to the entire purging system, can get switched off when an error state is detected. According to another embodiment, a ventilation process can be activated when an error condition is detected. The invention is not limited to these error reactions.

According to the third aspect of the invention, an energy system is provided which comprises the features of independent claim 19. The system according to the invention is in particular a house energy system.

The energy system comprises an energy source device, which is configured in particular as an electrolysis device, preferably for producing hydrogen. Additionally, or alternatively, the energy system comprises an energy sink device which is configured, in particular, as a fuel cell device. In addition, the energy system optionally comprises a second energy source device, which is configured in particular as a high-pressure storage device, in particular for storing hydrogen, and/or a second energy sink device, which is preferably configured as a medium-pressure storage device, in particular for the intermediate storage of hydrogen.

The energy system also comprises a purging system for purging the energy source device and/or the energy sink device, said purging system being configured according to the first aspect and second aspect of the invention. In order to describe the construction and the mode of operation of the energy system, reference is also made in full to the general description further above, as well as to the description of the purging system according to the invention.

According to a preferred embodiment, the energy system comprises a first subsystem, which is arranged in particular in a system cabinet. The energy source device and/or the energy sink device as well as the purging system are then components of the first subsystem. Depending on the configuration, individual components of the storage system, for example pressure measuring devices, can also be provided outside the system cabinet.

According to the fourth aspect of the invention, a method for monitoring a storage system is provided which comprises the features of independent claim 20.

According to the method, a purging system according to the first and second aspect of the invention is operated. The purging system is in particular a component of an energy system according to the third aspect of the invention. For the operation of the method, in order to avoid repetitions, full reference is also made to the above description of the first and second and third aspects of the invention, as well as to the general description further above.

According to the method according to the invention, between the at least one monitoring device for monitoring the state of the purging system and the safety control device of the purging system, values and/or data are exchanged via suitable interfaces. Data is preferably exchanged via interfaces in the form of a communication link, whilst values, which are in particular sensor values, can also be transmitted via interfaces in the form of a line connection, depending on how the monitoring device(s) is/are designed.

The safety control device monitors the purging system in a safety-directed manner on the basis of the values and/or data, that are exchanged with the monitoring devices. In particular, error states are detected.

If error states are detected, suitable error reactions are then preferably initiated, which is preferably initiated by the safety control device. Such error reactions can be, for example, the display of the error states on a display device, so that the error states can be eliminated. In addition, or alternatively, acoustic warning signals can be generated. Depending on the type and degree of the error, individual components of the purging system, up to the entire purging system, can get switched off when an error state is detected. According to another embodiment, a ventilation process can be activated when an error condition is detected. The invention is not limited to these error reactions.

A number of advantages can be realized with the present invention. Thus, it is possible, for example, to dispense with the use of explosion-protected special components, for example hydrogen sensors. With suitable sensor devices, for example a pressure measuring device, a large part of the monitoring can be performed. In particular, when the purging system is installed in a system cabinet, no explosion-proof design is necessary since the system cabinet is technically ventilated. With the present invention, all states of the purging system are known and can be monitored in a safety-oriented manner. In addition, the monitored states can also be provided for non-safety-critical functions, for example for operating management.

BRIEF DESCRIPTION OF THE DRAWINGS

The invention will now be explained in more detail with reference to an exemplary embodiment with reference to the accompanying drawings, wherein

FIGS. 1 and 2 schematically depict an energy system 10, which is used as a house energy system. In FIG. 1, the basic structure of the energy system 10 is first described.

DETAILED DESCRIPTION OF THE PREFERRED EMBODIMENTS

Figure 1:
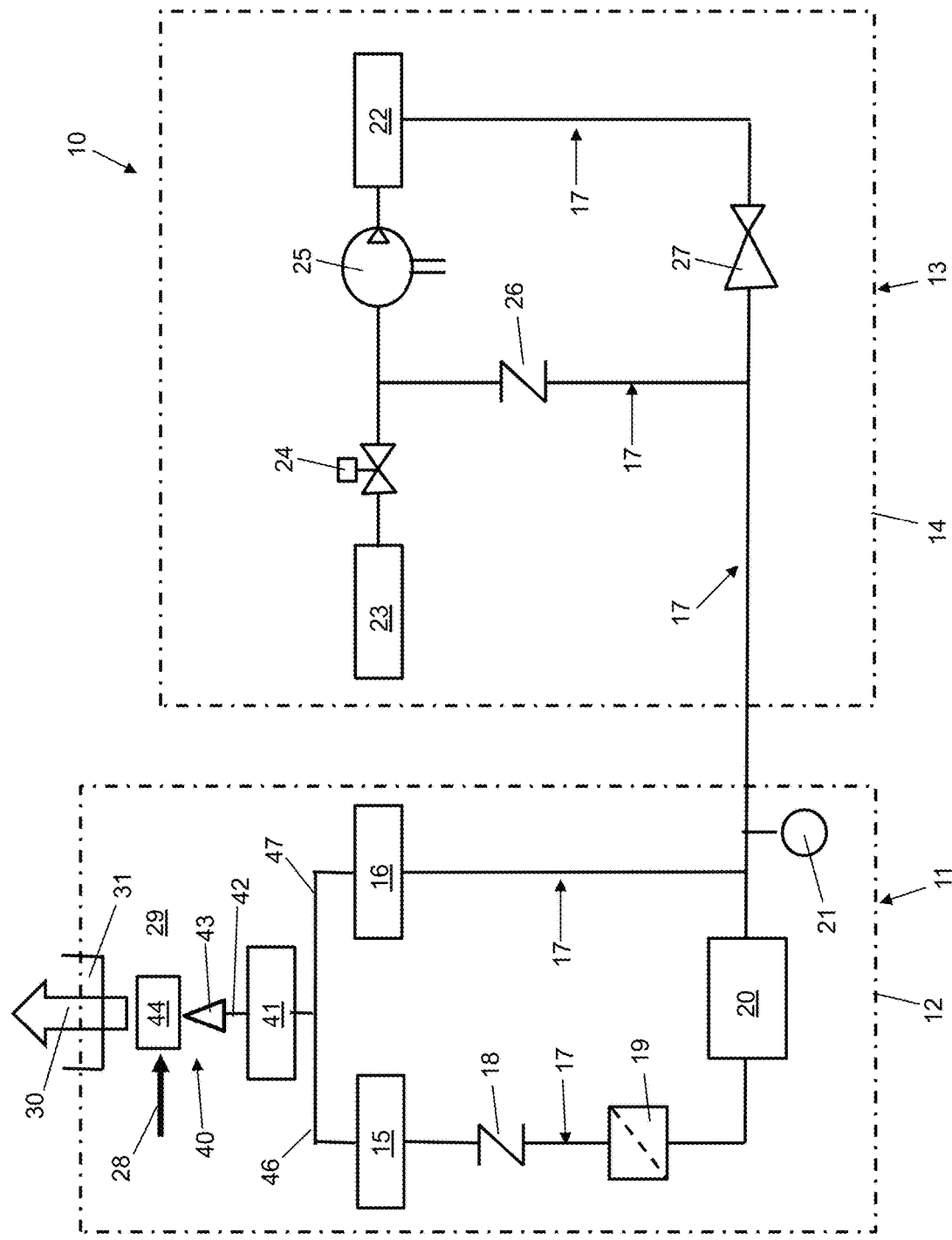
FIG. 1 is a schematic view of an energy system according to the invention with a purging system according to the invention.

As can be seen from FIG. 1, the energy system 10 initially comprises a first subsystem 11, which is configured as an inner system. This means that the first subsystem 11 is located inside the house. The individual components of the first subsystem 11 are accommodated in a first system cabinet 12. In addition, the energy system 10 comprises a second subsystem 13 in the form of an outer system. This means that the second subsystem 13 is located outside the house. The second subsystem 13 also comprises a series of different components housed in a second system cabinet 14.

The first subsystem 11 comprises a first energy source device 15, which is an electrolysis device for producing hydrogen. In addition, the first subsystem 11 comprises a first energy sink device 16, which is a fuel cell device. The second subsystem 13 comprises a second energy source device 22, which is a high-pressure storage device. The hydrogen produced in the electrolysis device is stored in the high-pressure storage device at up to 700 bar. In addition, the second subsystem 13 comprises a second energy sink device 23 in the form of a medium-pressure storage device, in which the hydrogen produced is temporarily stored at pressures between 20 and 60 bar, before it gets finally stored by the high-pressure storage device.

The individual components of the energy system 10 are connected to one another via a connecting line device 17, which consists of a number of different line sections. Individual line sections are designed as so-called bidirectional line sections.

The hydrogen produced in the first energy source device 15 by means of electrolysis leaves the first energy source device 15 via a line section of the connecting line device 17, in which, in the flow direction of the produced hydrogen, can be provided for example a check valve device 18 and subsequently a filter device 19 and a dryer device 20, in which the produced hydrogen gets filtered and dried. The filter device 19 and the dryer device 20 can alternatively also be located in the second subsystem 13.

From the dryer device 20, the produced hydrogen produced flows via a further line section of the connecting line device 17 to a further check valve device 26 in the second subsystem 13. From there, the produced hydrogen flows into the second energy sink device 23 functioning as a medium-pressure storage device, which is connected to the connecting line device 17 via a valve device 24, which in particular is provided as a shut-off valve, for example in the form of a solenoid valve. Upstream of the second energy source device 22, which is configured as the high-pressure storage device, a compressor device 25, in particular in the form of a piston compressor, is provided in the connecting line device 17. The hydrogen temporarily stored in the second energy sink device 23 is stored into the second energy source device 22 by actuating the compressor device 25.

This production process of the hydrogen up to its storage in the second energy source device 22 represents a first mode of operation of the energy system 10. In this first mode of operation of the energy system 10, connecting line device 17 has a pressure of 20 to 60 bar. Such a pressure also prevails in the second energy sink device 23. By means of the compressor device 25, the hydrogen which is withdrawn from the second energy sink device 23, which is a buffer storage device, is compressed to such an extent that it can be stored at pressures of up to 700 bar in the second energy source device 22, which is a high-pressure storage device.

The hydrogen stored in the second energy source device 22 is used for the operation of the first energy sink device 16 in the form of the fuel cell device. The operation of the fuel line device takes place in the second mode of operation of the energy system 10. However, the fuel cell device can only operate at pressures of less than 20 bar. In the second mode of operation of the energy system 10, the hydrogen is removed from the second energy source device 22 and gets expanded via an expansion device 27 in the form of a pressure reducer before it enters the first energy sink device 16 designed as the fuel cell device. To measure the pressure, at least one pressure measuring device 21, for example in the form of a pressure sensor, is provided.

Figure 2:
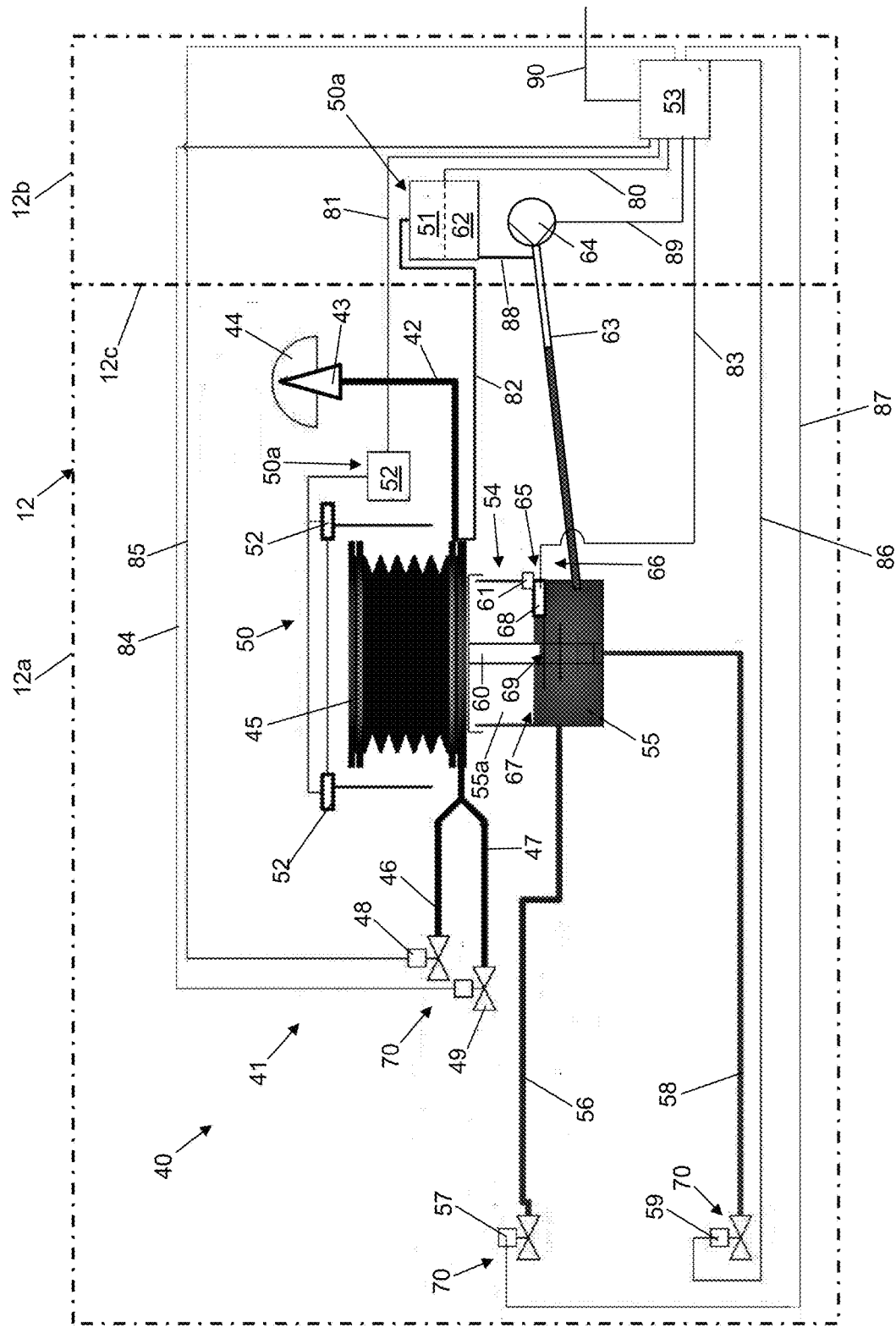
FIG. 2 shows the purging system according to the invention in detail.

The energy system 10 illustrated in FIGS. 1 and 2 represents a partial area of an overall house energy system, which is a multi-hybrid house energy storage system that is electrically autonomous and that is completely based on renewable energies.

The multi-hybrid house energy storage system makes it possible that the electrical energy generated by a photovoltaic (PV) system, a small wind power plant or the like is distributed as required to the entire year. The system acts as an island system independent of the electrical network. Rather, the system is to ensure the electrical autarchy of the house, so that no electrical energy has to be drawn from the power grid over the entire year.

The primary task of the house power system is to make available the recovered electrical energy from photovoltaic (PV) modules or the like to the consumer in the household. Secondary, electrical energy excesses can be temporarily stored in a battery short-term storage device at times of low load or high irradiation. Tertiary, the electrical energy can be medium to long-term stored in the hydrogen long-term storage as gaseous hydrogen for times of low irradiation such as night, winter or the like, and can be needs-based made available again at any time by means of a fuel cell.

Besides to energy-related tasks, the system also functions as a controlled living room ventilation by means of a built-in ventilation device.

The hydrogen produced in the electrolysis device flows via the hydrogen line into the outwardly provided pressure storage system.

In the event of a lack of or insufficient PV energy, energy is supplied from the battery to cover the consumer load. If the energy stored in the short-term storage device is not sufficient, the fuel cell device can satisfy the additional electrical energy requirement. In the fuel cell operation, the hydrogen flows from the pressure storage system to the fuel cell device via the hydrogen line.

The simultaneous operation of the fuel line device and the electrolysis device is excluded. The entire system is operated centrally via an energy manager with predictive energy management.

In principle, the second subsystem is provided for operation in the outer region, but can also be erected and operated within a special region of the house under certain conditions.

During the operation of energy system 10, it is necessary that the first energy source device 15 in the form of the electrolysis device as well as the first energy sink device 16 in the form of the fuel cell device get purged at regular terms, whereby the fuel cell device is particularly purged on the anode side, and the electrolysis device is particularly purged on the cathode side. Purging is necessary, in particular, in order to discharge, at regular intervals or as a function of the operating states, undesired foreign gas components, and liquid water which accumulates locally in the cell structures, which can negatively influence the performance and the service life of the fuel cell device and/or of the electrolysis device.

Purging takes place with the aid of a purging system 40, its construction and operation will now be described in greater detail. As can be seen from FIGS. 1 and 2, the purging system 40 is arranged inside the system cabinet 12, the system cabinet 12, as can be seen from FIG. 2, having a left system cabinet side 12a and a right system cabinet side 12b which are separated from one another via a system cabinet wall 12c. The system cabinet 12 is an airtight cabinet construction.

The purging system 40 initially comprises a purging device 41 which, for example, comprises at least one storage chamber 45, in particular a volume-variable storage chamber 45, for example in the form of a bellows. The purging device 41, in particular the storage chamber 45, is connected via a first line section 46 to the first energy source device 15 in the form of the electrolysis device and via a second line section 47 to the first energy sink device 16 in the form of the fuel cell device 16. A valve device 48, 49, which is preferably designed as a shut-off valve, for example as a solenoid valve, is located in each of both line sections 46, 47. During the purging process, a discharge volume flow 42 emerges from the purging device 41, which contains hydrogen, which at this point represents a hazardous gas. In principle, this forms an explosive atmosphere, so that it is necessary to reduce the discharge of hydrogen during the purging process below the explosion limit. This is accomplished, for example, by mixing and diluting the hydrogen-containing discharge volume flow 42 with an air flow 28 of the energy system 10, in particular an exhaust air volume flow, in a mixing zone 29 of the first system cabinet 12, which is a specific zone provided for this purpose, and which is preferably equipped with corresponding safety measures, in such a way that the hydrogen content in the resulting exhaust air volume flow 30 thus produced only has a content lying below the explosion limit, for example, of less than 10,000 ppm (1% by volume). The discharge of the discharge volume flow 42 into the environment, that is to say into the mixing zone 29, generally takes place via a suitable outflow device 43, which, for example, is provided as a throttle, nozzle or the like. The exhaust air volume flow 30 produced in the course of mixing is discharged from the first subsystem 11 or the first system cabinet 12 via an exhaust air channel 31 and can be provided for other functions, for example ventilation and/or heating and/or cooling. For safe dilution of the discharge volume flow 42, a mixing device 44 can preferably be provided in the mixing zone 29, in which the discharge volume flow 42 is mixed with the air flow 28.

In FIG. 2, the purging system 40 is shown in detail. According to the invention, the purging system 40 is configured in such a way that a safety-oriented monitoring is made possible therewith. According to the invention, this is achieved by a number of different monitoring measures. In FIG. 2, for explanatory purposes, a number of these monitoring measures are shown in parallel and next to one another. However, it is to be understood that the present invention, as set forth in the general description, may include only a sub-combination of the monitoring measures.

The purging system 40 comprises a first monitoring device 50 for monitoring the state of the storage chamber 45, which comprises at least one sensor device 50a assigned to the storage chamber 45 for monitoring the filling level of the storage chamber 45. In addition, the purge system 45 comprises a compensation container device 54 fluidly connected to the storage chamber 45. The compensation container device 54 serves to provide compensation for the storage chamber 45, in particular when the latter has reached a maximum or critical filling level with respect to the filling quantity and/or filling pressure.

A central feature of the purge system 40 is provided by a safety control device 53. The safety control device 53, which is configured, for example, as a safety controller, has the function of implementing a safety-oriented monitoring of the purging system 40. In particular the safety control device 53 is configured in such a way that it is capable to detect error states in the purging system 40 and to initiate suitable error reactions when such error conditions are detected.

In addition, the purging system 40 comprises a second monitoring device 66 configured to monitor the state of the compensation container device 54.

In order to monitor the state of the volume-variable storage chamber 45, the sensor device 50a for monitoring the filling level of the storage chamber 45, which is a component of the first monitoring device 50 for monitoring the state of the storage chamber 45, comprises a sensor device 52 for detecting the expansion of the storage chamber 45, which sensor device is designed as an optical sensor device in the form of an optical light barrier device in the exemplary embodiment. This sensor device 52 is connected, for example communication-connected, to the safety control device 53 via a suitable interface 82.

Alternatively, or additionally, the sensor device 50a for monitoring the filling level of the storage chamber 45 can comprise a pressure measuring device 51 or be provided as pressure measuring device, in particular for detecting the pressure within the storage chamber 45. The pressure measuring device 51, which is preferably in the form of a pressure measuring device for determining a differential pressure, is connected to the safety control device 53 via a suitable interface 80, for example in a line-connected and/or communication-connected manner depending on the configuration. The pressure measuring device 52 can comprise a sensor element arranged on or in the storage chamber 45, for example a pressure measuring cell, which is line-connected to the actual pressure measuring device 52 via an interface 82.

The compensation container device 54 comprises a compensation container 55, which can be filled or can get filled at least partially with water, in particular with ultra-pure water. Furthermore, the compensation container device 54 comprises a compensation tube 60 which is connected to the storage chamber 45 and which opens into the compensation container 55. An overflow 61 is also found in the compensation container 55. In addition, the compensation container 55 comprises a third line section 56 which is configured as a feed line to the compensation container 55 and in which a valve device 57 is provided, as well as a fourth line section 58 which is configured as a discharge line from the compensation container 55 and in which a valve device 59 is provided. Both valve devices 57, 59 are preferably shut-off valves, preferably solenoid valves. The compensation container 55 is preferably located below the storage chamber 45, for example of the bellows. The storage chamber 45 is connected in an airtight manner at the bottom to the compensation tube 60. The compensation tube 60 ends in the compensation container 55. Since the compensation container 55 is partially filled with water, the compensation tube 55 ends within the water column located in the compensation container 55. Hydrogen-containing gas located in the storage chamber 45 and also water can flow out of the storage chamber 45 into the compensation container 55 via the compensation tube 60. The compensation container 55 thus serves, on the one hand, as an overpressure compensation for the storage chamber 45. If the pressure in the storage chamber 45 is too high, or if the storage chamber 45 is expanded too far, the gas mixture presses from the storage chamber 45 against the water column in the compensation tube 60 and in the compensation container 60. The gas is forced through the water column in the compensation tube 60 and pearls into the intermediary space 55a of the compensation container 55, which extends between the surface of the water column and an upper cover of the compensation container 55. As the pressure in the storage chamber 45 rises, the level in the compensation tube 60 drops, so that the level in the compensation tube 60, when being detected respectively, can be used as a measure of the pressure prevailing in the storage chamber 45.

Furthermore, there is also water in the storage chamber 45, which likewise passes via the compensation tube 60 into the compensation container 55. This is preferably carried out according to the principle of the communicating tubes known per se. When the water column in the compensation container 55 has reached a maximum height, the water can be discharged via the fourth line section 58. For this purpose, the latter comprises the valve device 59. The maximum height of the water column in compensation container 55 is measured by a suitable device 65 for detecting the height of the water column in the form of a float sensor device 68 or as a sensor device for weight measurement. The measured values of the sensor device 68 are evaluated in the safety control device 53, for this purpose, is connected, in particular communication-connected, to sensor device 68 via an interface 83. Water can be filled in into the compensation container 55 via the third line section 56 comprising the valve device 57. Due to the filled height of the water column in the compensation container 55, for example, the pressure behavior in the storage chamber 45 can be influenced and adjusted. The draining and filling of water from and into the compensation container 55 is controlled via the safety control device 53. The valve devices 57, 59 are connected via suitable interfaces 86, 87 to the safety control device 53, in particular communication-connected. In the same way, the valve devices 48, 49 are also connected to the safety control device 53 via suitable interfaces 84, 85, in particular communication-connected.

By means of such a configuration of the compensation container device 54, a regular exchange of the water in the compensation container 55 is also possible, for example, for protection against germination. For example, it may be provided that the water is discharged from the compensation container 55 via corresponding commands of the safety control device 53 at defined time intervals or at defined times, and subsequently refilled.

According to a further embodiment, the monitoring device 66 for monitoring the state of the compensation container device 54 comprises a device 67 for monitoring the liquid column within the compensation container 55. The device 67 for monitoring the liquid column can in particular comprise a switch device for emptying and filling the compensation container 55 or can interact therewith, said device 57 being connected, in particular communication-connected, via an interface to the safety control device 53.

In addition, the device 65 for detecting the hight of the liquid column in the compensation container 55 comprises a pressure measuring device 62 for determining differential pressure between the pressure in the storage chamber 45 and the pressure of the water column in the compensation container 55. This pressure measuring device 62 can, for example, be configured as its own independent second pressure measuring device, compared to the first pressure measuring device 51 as described further above. Or, however, the pressure measuring device 62 is a component of the first pressure measuring device 51. Regardless of which variant, the second pressure measuring device 62, regardless of which variant, is connected, for example communication-connected, to safety control device 53 via a suitable interface 80. The second pressure measuring device 62 cooperates via an interface 88 with a measuring tube 63 which protrudes outwardly from the compensation container 55. This is preferably closed at its free end. In the measuring tube 63 there are partially water from the compensation container 55 and air. The second pressure measuring device 62 for determining the differential pressure is provided for a differential pressure determination between the pressure in the storage chamber 45 and the pressure of the air in the measuring tube 63. The differential pressure determined is evaluated in the safety control device 53, for example, in that the determined differential pressure values are compared against reference values. For adjusting the measuring tube 63, it is connected to a pump device 64 for air, in particular a "bead pump" device. The use of such a pump device 64 is used in particular for "zeroing" of the measuring tube 63. The pump device 64 is connected, for example communication-connected, to the safety control device 53 via a suitable interface 89.

The second monitoring device 66 for monitoring the state of the compensation container device 54 and/or the first monitoring device 50 for monitoring the state of the storage chamber 45 finally also comprise a device 69 for detecting the height of the water column, that is to say the level, in the compensation tube 60. The compensation container 55 serves, among other things, as an overpressure compensation in the storage chamber 45. If the pressure in the storage chamber 45 is too high, or if the storage chamber 45 is expanded too far, the gas mixture from the storage chamber 45 presses against the water column in the compensation tube 60. The gas is pressed through and pearls into the intermediary space 55a between the water column and the cover in the compensation container 55. The level in this case decreases in the compensation tube 60 with increasing pressure in the storage chamber 45. The knowledge of the level thus permits conclusions to be drawn about the pressure prevailing in the storage chamber 45. The device 69 for detecting the hight of the level in the compensation tube 60 can, for example, be realized optically, for example with the aid of a measuring scale, or else by means of another sensor device. If a sensor device is used, it is preferably connected to the safety control device 53 via a suitable interface.

The purging system 40 preferably comprises a third monitoring device 70 for monitoring the operability of the valve devices 48, 49, 57, 59. For example, the safety control device 53 can issue commands via the corresponding interfaces in order to open and close the valve devices 48, 49, 57, 59 according to specifications. The third monitoring device 70 can additionally or alternatively also comprise at least one sensor device which is provided in such a way that it is capable to check the tightness of the valve devices 48, 49, 57, 59. The commands and possibly determined sensor values are then transmitted via the interfaces.

The safety control device 53 preferably comprises an interface 90, for example a communication interface, to an operating management device of the purging system 40 or of the energy system 10. As a result, safety-relevant states of the purging system 40 can also be used for non-safety functions.

Upon detection of error conditions, suitable error reactions are then initiated via the safety control device 53. Such error reactions can be, for example, the display of the error states on a display device, so that the error states can be eliminated. Additionally, or alternatively, acoustic warning signals may be generated. Depending on the type and degree of the error, individual components of the purging system 40 can get switched-off, up to the entire purging system 40, upon detection of an error state.

LIST OF REFERENCE NUMERALS

10 Energy system (house energy system)
11 First subsystem (inner system)
12 First system cabinet
12a Left side of cabinet wall
12b Right side of cabinet wall
12c Wall of system cabinet
13 Second subsystem (outer System)
14 Second system cabinet
15 First energy source device (electrolysis device)
16 First energy sink device (fuel cell device)
17 Connecting line device
18 Check valve device
19 Filter device
20 Dryer device
21 Pressure measuring device
22 Second energy source device (high-pressure storage device)
23 Second energy sink device (medium-pressure storage device)
24 Valve device
25 Compressor device
26 Check valve device
27 Expansion device (pressure reducer)
28 Air volume flow (exhaust air volume flow)
29 Mixing zone
30 Exhaust air volume flow
31 Exhaust air channel
32 Cooler device (emergency cooler)
40 Purging system
41 Purging device
42 Discharge volume flow
43 Outflow device
44 Mixing device
45 Storage chamber (variable in volume)
46 First line section
47 Second line section
48 Valve device
49 Valve device 50 Monitoring device for monitoring the state of the storage chamber
50a Sensor device for monitoring the filling level of the storage chamber
51 Pressure measuring device
52 Sensor device for detecting the expansion of the storage chamber
53 Safety control device
54 Compensation container device
55 Compensation container
55a Intermediary space
56 Third line section (supply line)
57 Valve device
58 Fourth line section (drain-off line)
59 Valve device
60 Compensation tube
61 Overflow
62 Pressure measuring device
63 Measuring tube
64 Pump device
65 Device for detecting the height of the liquid column
66 Monitoring device for monitoring the state of the compensation container device
67 Device for monitoring the liquid column within the compensation container
68 Float sensor device
69 Device for detecting the height of the liquid column in the compensation tube
70 Monitoring device for monitoring the operability of the valve devices
80 Interface (communication)
81 Interface (communication)
82 Interface
83 Interface (communication)
84 Interface (communication)
85 Interface (communication)
86 Interface (communication)
87 Interface (communication)
88 Interface
89 Interface (communication)
90 Interface to the operating management device (communication)

The invention claimed is:

1. A purging system (40) for purging an energy source device (15) and/or an energy sink device (16) of an energy system (10), comprising a purging device (41) with a storage chamber (45), which is fluidically connected on the inlet side to a line section (46), which leads off from the energy source device (15) and is designed as a purging line, and/or to a line section (47), which leads off from the energy sink device (16) and is designed as a purging line, a monitoring device (50) for monitoring the state of the storage chamber (45), wherein the monitoring device (50) comprises at least one sensor device (50a) assigned to the storage chamber (45) for monitoring the filling level of the storage chamber (45), characterized in that the purging system (40) comprises a safety control device (53), in that the sensor device (50a) for monitoring the filling level of the storage chamber (45) is connected to the safety control device (53 via an interface (80) associated therewith, in that the sensor device (50a) for monitoring the filling level of the storage chamber (45) comprises a pressure measuring device (51) or is designed as a pressure measuring device, in particular for detecting the pressure within the storage chamber (45), and in that the safety control device (53) is provided for the safety-directed monitoring of the purging system (40), in particular for detecting error states and for initiating error reactions.

2. The purging system according to claim 1, characterized in that the pressure measuring device (51) is provided as a pressure measuring device for detecting a differential pressure and/or for detecting a relative pressure and/or for detecting an absolute pressure.

3. A purging system (40) for purging an energy source device (15) and/or an energy sink device (16) of an energy system (10), comprising a purging device (41) with a storage chamber (45), which is fluidically connected on the inlet side to a line section (46), which leads off from the energy source device (15) and is designed as a purging line, and/or to a line section (47), which leads off from the energy sink device (16) and is designed as a purging line, a first monitoring device (50) for monitoring the state of the storage chamber (45), wherein the first monitoring device (50) comprises at least one sensor device (50a) assigned to the storage chamber (45) for monitoring the filling level of the storage chamber (45), and further comprising a compensation container device (54) being fluidically connected to the storage chamber (45) characterized in that the purging system (40) comprises a safety control device (53), in that the sensor device (50a) for monitoring the filling level of the storage chamber (45) is connected to the safety control device (53) via an interface (80, 81) associated therewith, in that the purging system (40) comprises at least one further monitoring device (66) for monitoring the state of the compensation container device (54), which is connected to the safety control device (53) via at least one interface (83, 89) associated therewith, and in that the safety control device (53) is provided for the safety-directed monitoring of the purging system (40), in particular for detecting error states and for initiating error reactions.

4. The purging system according to claim 1, characterized in that the safety control device (53) comprises a data processing device and/or a safety controller and/or a safety logic with at least one safety relay, or is designed in such a manner.

5. The purging system according to claim 1, characterized in that the purging system (40) is arranged in a system cabinet (12), which is in particular airtight.

6. The purging system according to claim 3, characterized in that the storage chamber (45) is configured as a storage chamber of variable volume, in that the sensor device (50a) for monitoring the filling level of the storage chamber (45) is configured as a sensor device (52) for detecting the expansion of the storage chamber (45), and in that the sensor device (52) for detecting the expansion of the storage chamber is optionally provided as an optical light-barrier device or as a laser-assisted distance measuring device or as a strain gauge device.

7. The purging system according to claim 3, characterized in that the sensor device (50a) for monitoring the filling level of the storage chamber (45) comprises a pressure measuring device (51) or is provided as a pressure measuring device, in particular for detecting the pressure within the storage chamber (45), and in that the pressure measuring device (51) is configured in particular as a pressure measuring device for detecting a differential pressure and/or for detecting a relative pressure and/or for detecting an absolute pressure.

8. The purging system according to claim 3, characterized in that the compensation container device (54) comprises a compensation container (55), which can be filled or is filled at least partially with a liquid, in particular with water, in that the compensation container device (54) comprises a compensation tube (60) which, in particular in an airtight manner, is connected to the storage chamber (45) and which opens into the compensation container (55), and in that the compensation container (55) optionally comprises a line section (56) configured as a supply line to the compensation container (55) and/or a line section (56) configured as a discharge line from the compensation container (55).

9. The purging system according to claim 8, characterized in that the monitoring device (66) for monitoring the state of the compensation container device (54) comprises a device (67) for monitoring the liquid column within the compensation container (55), which in particular comprises a switch device for emptying and filling the compensation container (55) or cooperates with the same.

10. The purging system according to claim 8, characterized in that a time function is implemented in the safety control device (53), which is provided in order to monitor the refill time of the liquid into the compensation container (55) after emptying.

11. The purging system according to claim 8, characterized in that the monitoring device (66) for monitoring the state of the compensation container device (54) comprises a device (65) for detecting the height of the liquid column in the compensation container (55), which device being configured in particular as a float sensor device (68) or as a device for weight measurement.

12. The purging system according to claim 8, characterized in that the device (65) for detecting the height of the liquid column in the compensation container (55) comprises a pressure measuring device (62) for determining the differential pressure between the pressure in the storage chamber (45) and the pressure of the liquid column.

13. The purging system according to claim 11, characterized in that the pressure measuring device (62) for determining the differential pressure interacts with a measuring tube (63) which protrudes outwardly from the compensation container (55), and which in particular is closed at the end, in which measuring tube partially liquid from the compensation container (55) and air is located, and in that the pressure measuring device (62) for determining the differential pressure is provided for differential pressure determination between the pressure in the storage chamber (45) and the pressure of the air in the measuring tube (63).

14. The purging system according to claim 13, characterized in that, in order to adjust the measuring tube (63), the latter is connected to a pump device (64) for air, in particular a bead pump device.

15. The purging system according to claim 8, characterized in that the monitoring device (66) for monitoring the state of the compensation container device (45) and/or the first monitoring device (50) for monitoring the state of the storage chamber (45) comprises a device (69) for detecting the height of the liquid column in the compensation tube (55).

16. The purging system according to claim 1, characterized in that a valve device (48, 49, 57, 59) is provided in at least one of the line sections, in that the purging system (40) comprises a further monitoring device (70) for monitoring the operability of the valve device(s) (48, 49, 57, 59), and in that the further monitoring device (70) is connected to the safety control device (53) via at least one interface (84, 85, 86, 87) being assigned thereto.

17. The purging system according to claim 1, characterized in that the safety control device (53) comprises a comparison device for comparing detected sensor device values and/or pressure measurement device values with reference values, in particular with maximum and/or minimum reference values, and/or in that command functions for time-related and/or event-related monitoring are stored in the safety control device (53).

18. The purging system according to claim 1, characterized in that the safety control device (53) comprises an interface (90) to an operating management device of the purging system (40) or of the energy system (10), in order to make safety-relevant states of the purging system (40) usable also for non-safety functions.

19. An energy system (10), in particular house energy system, comprising an energy source device (15), which is configured in particular as an electrolysis device, and/or comprising an energy sink device (16), which is configured in particular as a fuel cell device, and comprising a purging system (40) for purging the energy source device (15) and/or the energy sink device (16), characterized in that the purging system (40) is configured according to claim 1.

20. A method for monitoring a purging system according to claim 1, characterized in that between the at least one monitoring device (50, 66, 70) for monitoring the state of the purging system (40) and the safety control device (53) of the purging system (40), values and/or data are exchanged via suitable interfaces (80 to 89), and in that the safety control device (53) monitors the purging system (40) on the basis of the values and/or data exchanged with the monitoring devices (50, 66, 70) in a safety-oriented manner, in particular detects error states, and initiates error reactions in the event of detection of error states.

* * * * *